Nov. 29, 1960
P. D. EVANS
2,962,597
POWER PLANT APPARATUS
Filed June 9, 1959
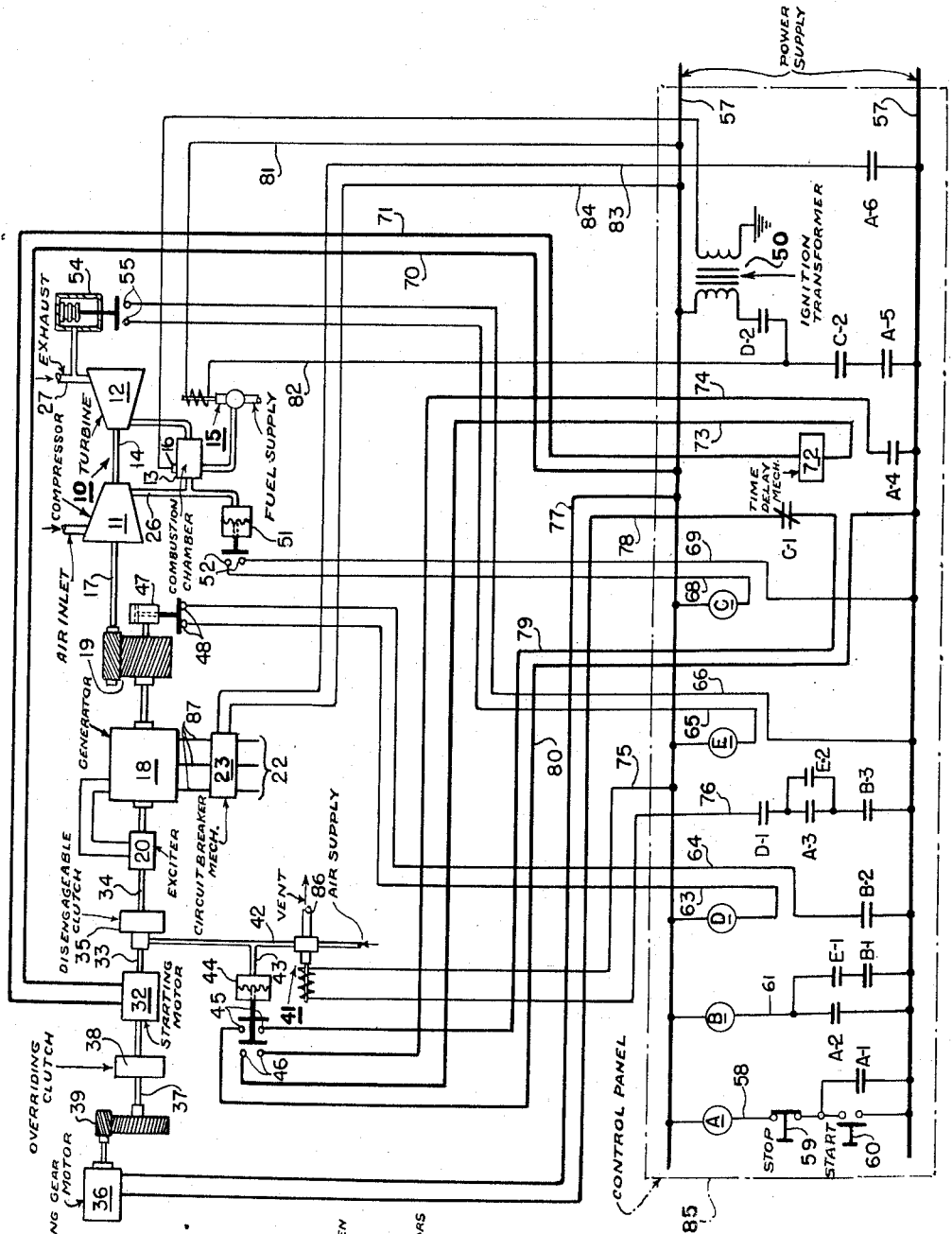
FIG.1.
FIG.2.
INVENTOR
PALMER D. EVANS
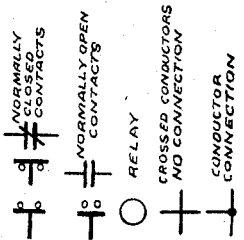

United States Patent Office 2,962,597
Patented Nov. 29, 1960

2,962,597
POWER PLANT APPARATUS

Palmer D. Evans, Newtown Square, Pa., assignor to Westinghouse Electric Corporation, East Pittsburgh, Pa., a corporation of Pennsylvania Filed June 9, 1959, Ser. No. 819,043

6 Claims. (Cl. 290—2)

This invention relates to power conversion apparatus, more particularly to a starting system for a power plant and has an object to provide an improved system of this type.

It is a further object of the invention to provide a system for initially starting a power plant and for subsequently rotating the rotating elements of the power plant at a low speed after shutdown of the plant.

Another object is to provide a system of the above type, wherein a high speed output starting motor and a low speed output turning gear motor are arranged in such a manner that each is automatically operable in response to operating conditions of the power plant to assume control of the driving of the rotating elements of the plant in a manner to provide a highly reliable and effective system.

A more specific object is to provide a starting and stopping system of the above type, in which the low speed turning gear motor and the high speed starting motor are so arranged that the turning gear motor is protected against excessive speed of rotation during the time that the starting motor is running.

In accordance with the invention, in a power plant such as a gas turbine power plant, there is provided a system for initially driving the rotating elements of the power plant to a self-sustaining speed, which system is further effective to slowly rotate the rotating elements upon shutdown of the power plant to prevent warping of the rotating elements during the period in which they are cooling to substantially ambient temperatures.

The system includes a low speed output turning gear motor and a high speed starting motor connected in tandem with each other and the rotating elements of the power plant. The starting motor is interposed between the turning gear motor and the rotating elements of the plant and is connected to the latter by a disengageable clutch. The turning gear motor is connected to the driving motor by an overriding clutch.

Control mechanism is provided for controlling energization of both the motors and for effecting engagement of the disengageable coupling, and a time delay mechanism is incorporated in the starting motor circuit. Accordingly, when starting the power plant, the turning gear motor is energized first, thereby to initiate slow rotation of the rotating elements of the plant through the starting motor. The turning gear motor is thus effective to overcome the static friction and inertia of the rotating elements and commence rotating the latter at a sufficient speed to lessen the initial starting load on the starting motor.

Subsequent to energization of the turning gear motor, the starting motor is energized to drive the rotating elements of the plant to self-sustained speed, about 40 percent of rated speed. At a speed below the self-sustaining speed, the turning gear motor is deenergized and permitted to come to rest.

Upon attainment of the speed at which fuel combustion may be sustained, about 20 percent of rated speed, a device responsive to compressor outlet pressure, or other condition of the plant indicating this speed, is effective to initiate flow of fuel to the combustion apparatus of the plant and ignition of the same. As fuel combustion is attained, the hot motive products of combustion are employed to energize the turbine section and thence exhausted from the plant, in a known manner, thereby further accelerating the plant. A speed sensing device is further provided to subsequently disengage the starting motor and to effect disengagement of the disengageable coupling as the power plant attains self-sustaining speed, thereby permitting the starting motor to come to rest.

The system further incorporates control mechanism for effecting reengagement of the disengageable coupling and subsequent energization of the turning gear motor, thereby to initiate slow rotation of the rotary elements of the plant when the latter is shut down. This mechanism includes the compressor pressure responsive device.

A temperature sensitive mechanism, responsive to temperature of the exhaust gases of the plant, is further provided to effect deenergization of the turning gear motor and the disengageable coupling upon a reduction in temperature of the gases to substantially ambient atmospheric temperature.

The foregoing and other objects are effected by the invention as will be apparent from the following description and claims taken in connection with the accompanying drawing, forming a part of this application, in which:

Fig. 1 is a schematic view illustrating the invention incorporated in a power plant of the gas turbine type; and Fig. 2 shows a plurality of symbols employed in Fig. 1 with explanatory legends.

Referring to the drawing in detail, there is shown a power plant 10 of the gas turbine type comprising the usual components, namely a compressor portion 11, a gas turbine portion 12 and a fuel combustion chamber 13 interposed between the compressor 11 and the turbine 12. The compressor 11 and the turbine 12 are provided with rotor structure (not shown) connected to each other by a shaft 14, and fuel is injected into the combustion chamber 13 from a suitable fuel supply (not shown) by a fuel control mechanism 15. Also, an igniter 16 is provided for igniting the combustible fuel and air mixture attained within the combustion chamber 13.

The rotating elements of the gas turbine are connected to a power output shaft 17 which is connected to a suitable load, for example, an electrical generator 18 through reduction gearing 19, and jointly therewith an exciter generator 20 may also be driven for supplying the generator field windings (not shown). In a manner well known in the art, the generator 18 is connected to an electrical power transmission line 22 by a circuit breaker mechanism 23 of any suitable type.

The above power plant operates somewhat conventionally in the following manner. As the rotating elements of the gas turbine rotate, air is drawn through the compressor 11, pressurized and directed through its outlet 26 into the fuel combustion chamber 13, wherein it combines with the fuel admitted by the fuel control mechanism 15 to provide a combustible fuel and air mixture. The combustible mixture is ignited by the igniter 16 to form hot products of combustion which are directed through the turbine 12 to motivate the same and then exhausted therefrom as indicated at 27. Accordingly, the turbine rotor is effective to drive the compressor rotor directly, and the generator 18 and the exciter 20 through the reduction gearing 19.

Since as well known in the art, turbines rotate at a relatively high speed, for example, on the order of 8,000 to 12,000 r.p.m., and since electrical generators rotate at a considerably lower speed, for example, 1800 or 3600 r.p.m., the reduction gearing 19 is effective to rotate the generator 18 at a lower speed. For simplicity of further explanation, this speed will be assumed to be 3600 r.p.m.

However, gas turbine power plants are not self-starting and must be initially cranked or rotated by a separate power supply to a speed at which they become self-sustaining. This speed is about 40 percent of rated speed. In reference to speed of the generator 18 this speed is on the order of 1440 r.p.m.

As further known in the art, due to the high temperatures to which the rotating elements of the gas turbine power plant are subjected in operation, it is desirable to slowly rotate the rotating elements at a slow speed for a considerable length of time after the plant is shut down to permit the rotating elements to cool uniformly, thereby obviating warpage or bowing thereof.

In accordance with the invention, there is provided a system for initially rotating the gas turbine power plant to a self-sustaining speed for starting purposes and for subsequently rotating the same at a considerably lower speed after the plant is shut down. For simplicity of explanation, all speed values mentioned hereafter will be in terms of generator speed.

The control system comprises a starting motor 32 having an output shaft 33 connected to the generator exciter shaft 34 by a disengageable clutch 35, and a turning gear motor 36 having its output shaft 37 connected to the output shaft 33 of the starting motor 32 by an overriding clutch 38. Between the output shaft 37 and the motor 36, reduction gearing 39 is provided to reduce the effective or output speed of the turning gear motor 36 at the overriding clutch 38. Accordingly, the starting motor 32 is rated at about 1750 r.p.m. and is effective to drive all the rotating elements that are connected thereto at a relatively high speed or sufficient to rotate the rotating elements of the plant to the self-sustaining speed (about 1440 r.p.m.), while the turning gear motor 36 is effective to rotate the overriding clutch 38 and all the elements connected thereto at a considerably lower speed (on the order of 5 to 10 r.p.m.) or sufficient to slowly rotate the rotating elements of the plant for cooling purposes after shutdown.

Although the disengageable clutch 35 may be either electrically, pneumatically or hydraulically controlled, in the example shown it has been indicated as being of the pneumatic type, and actuated by compressed air delivered thereto from a suitable pressurized air supply (not shown). A solenoid valve mechanism 41 is provided for controlling delivery of the compressed air to the disengageable clutch 35 through a conduit 42. Downstream of the valve mechanism 41 there is provided a branch conduit 43 communicating with a pressure switch mechanism 44. The pressure switch 44 may be of any suitable type and, as illustrated, is provided with two pairs of normally open contacts 45 and 46 for controlling the energization of motors 36 and 32, respectively.

A speed sensing mechanism 47, arranged to sense the speed of the generator 18 (and indirectly, the speed of the rotating elements of the power plant) is further provided. This speed sensing device has a pair of normally closed contacts 48 which are opened when the generator attains a speed (in increasing direction) of about 1600 r.p.m., or slightly above the self-sustaining speed of the power plant.

The fuel igniter 16 is energized by the secondary winding of an ignition transformer 50. In addition to the above, a pressure responsive switch mechanism 51 connected to the compressor outlet 26 is further provided. The pressure responsive switch 51 has a pair of normally open contacts 52 which are closed when the compressor outlet pressure rises to a pressure value corresponding to the speed at which fuel combustion may be attained in the power plant or about 720 r.p.m.

A temperature sensing mechanism 54 responsive to temperature of the exhaust gases from the turbine is further provided. The temperature sensing mechanism 54 has a pair of normally open contacts 55 which are closed when the temperature of the turbine exhaust gases rises to a temperature above atmospheric, for example, about 150° F.

The above mentioned control mechanisms are controlled by a plurality of electrical relays A, B, C, D and E connected by separate electrical circuits to an electrical power supply 57. Relay A has six pairs of contacts A-1, A-2, A-3, A-4, A-5 and A-6 and is connected across the power supply by a conductor 58 having a normally closed "stop" switch 59 and a normally open "start" switch 60 connected in series therein.

Relay B is connected to the power supply 57 by conductor 61 and has three pairs of contacts B-1, B-2 and B-3.

Relay D is connected to the power supply by a pair of conductors 63 and 64 having the speed sensing switch mechanism 48 disposed therein and has two pairs of contacts D-1 and D-2.

Relay E is connected to the power supply through a pair of conductors 65 and 66 having the contacts 55 of the temperature sensing mechanism 54 disposed therein and is provided with two pairs of contacts E-1 and E-2.

Relay C is connected across the power supply by a pair of conductors 68 and 69 having the contacts 52 of the pressure responsive mechanism 51 connected thereto and has two sets of contacts C-1 and C-2.

The starting motor 32 is connected across the power supply by a conductor 70 connected to one side of the power supply and a conductor 71 connected to a suitable time delay switch mechanism 72 which, in turn, is connected to the other side of the power supply by a pair of conductors 73 and 74 having the switch contacts 46 interposed therein in series with relay contacts A-4.

The solenoid valve mechanism 41 is connected across the power supply by means of conductors 75 and 76 having disposed in series therewith the relay contacts D-1, A-3 and B-3. The A-3 contacts are connected in parallel with relay contacts E-2.

The motor 36 is connected across one side of the power supply by a conductor 77 and to the other side by a conductor 78 having relay contacts C-1 disposed therein and conductors 79 and 80 having pressure switch contacts 45 disposed therein.

The fuel supply control 15 is connected across the power supply by a pair of conductors 81 and 82 having relay contacts C-2 and A-5 disposed in series therewith. The primary winding of the transformer 50 is connected to one side of the power supply directly and to the other side of the power supply through relay contacts D-2. The relay contacts D-2 are disposed in series with the contacts C-2 and A-5.

The circuit breaker mechanism 23 is connected across the power supply by a pair of conductors 83 and 84 having relay contacts A-6 disposed therein.

It will further be noted that relay contacts A-1 are disposed in parallel with the "start" switch 60 to provide a holding circuit, while relay contacts E-1 and B-1 are disposed in series with each other and in parallel with relay contacts A-2 in the circuit through relay B. It will further be noted that relay contacts C-1 are normally engaged, while all the other contacts are normally open.

The relays A, B, C, D and E may be disposed remotely from the power plant apparatus and starting motors and may be mounted on a suitable control panel 85 as indicated by the dot-dash rectangular outline. Also, in the arrangement shown, the "start" and "stop" switches 60 and 59 may be of the momentary "make" and momentary "break" depressible button types, respectively.

Starting operation

To start the power plant 10, the "start" switch 60 is momentarily depressed and initiates the following sequence of events. The relay A is energized thereby causing all of its contacts to engage. Accordingly, since the contacts A-1 are engaged, the holding circuit through relay A is maintained energized even after the "start" switch 60 is returned to the open position.

Relay B is energized through the engaged contacts A-2, thereby causing its contacts to engage.

Relay D is energized through engaged relay contacts B-2 and switch contacts 48, thereby moving its contacts D-1 and D-2 to the engaged position. Accordingly, the circuit to the solenoid valve mechanism 41 is made through the relay contacts D-1, A-3 and B-3, thereby causing the solenoid valve 41 to move to its open position. As the solenoid valve 41 moves to its open position, air from the air pressure supply is permitted to flow into conduits 42 and 43, thereby energizing the disengageable clutch 35 and moving the pressure switch 44 to the position in which its contacts 45 and 46 are engaged.

Since relay contacts C-1 are normally engaged, a circuit is made through conductors 77, 78, 79 and 80, connecting the turning gear motor 36 across the power supply 57. Accordingly, the motor output shaft 37 begins to rotate and, through the overriding clutch 38, rotates the starting motor and its output shaft 33. Power is thus transmitted through the engaged clutch 35, the exciter generator 20, the generator 18, and the power plant 10 through the reduction gearing 19 and the shafts 17 and 14, at a slow speed in the range of from 5 to 10 r.p.m.

After a short time delay, the time delay mechanism 72, in a known manner, will complete the circuit to the starting motor 32 through the engaged contacts 45 and realy contacts A-4, connecting the starting motor across the power supply. Accordingly, the starting motor assumes its function of accelerating the rotation of the above-mentioned rotating elements through the engaged clutch 35, rapidly exceeding the speed at which the turning motor is effective. As the speed exceeds the turning gear motor speed, the overriding clutch 38 begins to "override" and permits the turning motor 36 to idle without load. As the speed of the rotating elements attains the fuel combustion sustaining speed for the power plant, the pressure responsive switch 51 is energized by the increasing air pressure in the compressor outlet 26, thereby engaging the contacts 52 and energizing relay C.

As the relay C is energized, its contacts C-1 are moved to the disengaged position while its contacts C-2 are engaged. Accordingly, the electrical circuit to the turning gear motor 36 through conductor 78 is interrupted by the open relay contacts C-1, thereby causing the turning gear motor to be deenergized and come to rest. Concomitantly, the circuit to the fuel control mechanism 15 is made through the engaged relay contacts C-2 and A-5, thereby initiating flow of fuel from the fuel supply to the fuel combustion chamber 13. Since the D-2 contacts are already in the engaged position, the transformer 50 is also energized at the same time, thereby energizing the secondary winding of the transformer causing the igniter 16 to fire.

As the fuel admitted to the fuel combustion chamber 13 is combined with the air delivered thereto by the compressor 11 to form a combustible fuel and air mixture, this combustible mixture is ignited by the igniter 16 and the subsequent production of hot gaseous products of combustion are delivered to the turbine 12 to motivate the power plant and further accelerate the speed of its rotating elements with the continued assistance of the starting motor. The power plane 10 thus attains the self-sustaining speed and commences to further accelerate under its own power, so that the starting motor is no longer required.

As the speed of the power plant increases from the minimum self-sustaining speed (1440 r.p m.) to a higher value (1600 r.p.m.), the speed sensing switch mechanism 47 is effective to disengage its contacts 48, thereby interrupting the circuit through the relay D and deenergizing the same. As the relay D is deenergized, its contacts D-1 and D-2 are moved to their normal or disengaged position. Accordingly, disengagement of the D-1 relay contacts is effective to deenergize the solenoid valve mechanism 41, causing the same to interrupt the air supply to the pressure switch mechanism 44 and the disengageable clutch 35, and the pressurized air trapped in conduits 42 and 43 is bled to the atmosphere through a suitable bleed or vent as indicated at 86. The disengageable clutch 35 is thus disengaged and the pressure switch contacts 45 and 46 are disengaged, thereby locking out the circuit to the turning gear motor 36 and deenergizing the starting motor 32. Further, since the relay D has been deenergized, its contacts D-2 are deenergized to interrupt the power supply to the igniter 16.

The power plant is now capable of accelerating to its rated speed on its own power and, when such speed is attained, the generator is driven at its rated speed (3600 r.p.m.). Accordingly, since the control circuit to the circuit breaker mechanism is connected to the power supply by the engaged relay contacts A-6, the circuit breaker mechanism 23 is in condition to connect the generator output conductors 87 to its power transmission line 22. This connection, as well known in the art, may be either manually or automatically effected.

As the temperature of the exhaust gases from the turbine 12 rises to a temperature of about 150° F., the temperature sensing switch mechanism 54 is actuated in a direction to engage its contacts 55, thereby completing the electrical circuit through the relay E and connecting it across the power supply 57. Accordingly, its contacts E-1 and E-2 are moved to engaging positions and through relay contacts E-1 and B-1 the holding circuit through relay B is completed. Concomitantly therewith, the E-2 contacts complete the parallel circuit about the A-3 contacts in the circuit to the solenoid valve mechanism 41 through the conductors 75 and 76. However, since relay D is deenergized, the solenoid valve mechanism 41 is not energized but is conditioned for subsequent energization.

Stopping operation

To stop the power plant 10, the "stop" switch 59 is momentarily depressed, thereby deenergizing relay A and causing all of its contacts to return to their normal or disengaged positions. Although relay contacts A-2 are disengaged, relay B will still be energized by the holding circuit through relay contacts E-1 and B-1, as previously mentioned. The circuit to the starting motor 32 is interrupted through the A-4 contacts, the circuit breaker mechanism 23 is deenergized by the A-6 contacts and the fuel control mechanism 15 is deenergized by the A-5 contacts, thereby interrupting fuel flow to the fuel combustion chamber 13. As the fuel admission to the combustion chamber 13 is interrupted, the power plant 10 will begin to decelerate until its speed drops to 1600 r.p.m. At this speed, the speed sensing mechanism 47 is effective to reengage its contacts 48, thereby energizing relay D through engaged relay contacts B-2. As relay D is energized its contacts D-1 and D-2 are reengaged.

As the D-1 contacts are engaged, the circuit to the solenoid valve mechanism 41 is initiated through the relay contacts E-2 and B-3, moving the valve mechanism 41 in the direction to admit air pressure to the clutch 35 and pressure switch mechanism 44, thereby causing the clutch 35 to become engaged and engaging contacts 45 and 46.

Although the starting motor 32 is deenergized through the A-4 relay contacts, it is mechanically connected to the rotating elements of the power plant and, because of its inertia, causes the rotating elements to decelerate at a more rapid rate.

As the speed of the power plant 10 drops to 720 r.p.m., the compressor pressure output decays to a lower value, thereby causing the pressure responsive switch 51 to disengage its contacts 52. As the contacts 52 are disengaged, the relay C is deenergized and its contacts C–1 return to their normal or engaged position, while its contacts C–2 return to their normal or open position. Accordingly, since the contacts 46 of the pressure switch mechanism 44 are already engaged, the contacts C–1 are effective to complete the circuit to the turning gear motor 36 through the conductors 77 and 78, thereby connecting the turning gear motor across the power supply and causing it to turn. The turning effort of the motor 36 is ineffective to drive the rotating elements of the power plant at this time, since the speed of the rotating elements is considerably higher than the speed output of the turning gear motor. However, the turning gear motor is protected against overspeeding by the overriding clutch 38. As the speed of the rotating elements of the power plant further decelerates to a value equal to the speed of the turning gear motor 36, the turning gear motor assumes the load and becomes effective to continue rotating the rotating elements at this slow speed (5 to 10 r.p.m.).

This slow rotation of the rotating elements will continue as long as the temperature within the power plant 10 is at a higher than desired value. However, as the temperature of the power plant, as sensed by the temperature sensing switch mechanism 54, drops to a value of about 150° F., the switch 54 is effective to disengage its contact 55, thereby deenergizing relay E and effecting disengagement of its contacts E–1 and E–2. As the E–1 contacts are disengaged, the circuit therethrough is interrupted and the relay B is deenergized. As B is deenergized and its contacts B–2 are disengaged, relay D is deenergized, and as D is deenergized its contacts D–1 and D–2 are returned to their disengaged position. Disengagement of the D–1 contacts causes interruption in the circuit to the solenoid valve mechanism 41, deenergizing the same and shutting off the air supply to the clutch 35 and the pressure switch 44. Accordingly, the clutch 35 is disengaged and the switch contacts 45 and 46 are returned to their disengaged position. The turning gear motor 36 is thus deenergized by the disengaged switch contacts 45 and the rotating elements of the power plant will subsequently come to rest with all relays deenergized and ready for a new start.

It will now be seen that the invention provides a highly improved system for starting a power plant in a simple manner as well as stopping the system and slowly rotating the same until the temperature conditions within the power plant are at a safe level.

It will further be seen that the invention provides all the essential starting and stopping operations automatically and in proper sequence for optimum reliable performance of the system.

The invention further simplifies the stopping and slow rotation steps, since it obviates the necessity for assuring that the rotating elements have come to a full stop (zero speed) before engagement of the turning gear motor is effected.

While the invention has been shown in but one form, it will be obvious to those skilled in the art that it is not so limited, but is susceptible of various changes and modifications without departing from the spirit thereof.

What is claimed is:

1. In a gas turbine power plant including a compressor, a gas turbine for driving said compressor, fuel combustion structure disposed between said compressor and said gas turbine for providing hot motive gases to said turbine, means for supplying fuel to said combustion structure, and means for igniting the fuel delivered to said combustion structure; the combination comprising a first motor, a second motor, said second motor being interposed between said first motor and said compressor, an overriding clutch interposed between said first and second motors, a disengageable clutch interposed between said second motor and said compressor, means for effecting engagement of said disengageable clutch, means operable concomitantly with engagement of said disengageable clutch for effecting energization of said first motor, whereby said first motor is effective to initially drive said power plant at a low rotational speed through said second motor, means for effecting energization of said second motor subsequent to energization of said first motor, whereby said second motor is effective to drive and accelerate said power plant to a second and higher speed, and means responsive to a condition of said power plant for effecting deenergization of said first motor when said power plant attains a speed intermediate said low speed and said higher speed.

2. In a gas turbine power plant including a compressor, a gas turbine for driving said compressor, fuel combustion structure disposed between said compressor and said gas turbine for providing hot motive gases to said turbine, means including a fuel control mechanism for supplying fuel to said combustion structure, and means for igniting the fuel delivered to said combustion structure; the combination comprising a first motor, a second motor disposed in tandem with said first motor, said second motor being interposed between said first motor and said compressor, an overriding clutch interposed between said first and second motors, a disengageable clutch interposed between said second motor and said compressor rotor, means for effecting engagement of said disengageable clutch, means operable concomitantly with engagement of said disengageable clutch for effecting energization of said first motor, whereby said first motor is effective to initially drive said power plant rotor at a low rotational speed through said second motor, means including a time delay mechanism for effecting energization of said second motor subsequent to energization of said first motor, whereby said second motor is effective to drive and accelerate said power plant to a second and higher speed, means responsive to a condition of said power plant for effecting deenergization of said first motor when said power plant attains a speed intermediate said low speed and said higher speed, means for effecting energization of said fuel control mechanism and said igniting means at said intermediate speed, and means for effecting deenergization of said second motor and said disengageable clutch at said higher speed.

3. In a gas turbine power plant including a compressor, a gas turbine for driving said compressor, fuel combustion structure disposed between said compressor and said gas turbine for providing hot motive gases to said turbine, means including a fuel control mechanism for controlling fuel flow to said combustion structure, and means for igniting the fuel delivered to said combustion structure; a starting and stopping system comprising a low speed output motor, a high speed motor disposed in tandem with said low speed motor and interposed between said low speed motor and said compressor, an overriding clutch interposed between said motors, a disengageable clutch interposed between said high speed motor and said compressor, means for controlling said disengageable clutch, means responsive to engagement of said disengageable clutch for effecting energization of said low speed motor, whereby said low speed motor is effective to initially drive said power plant at a low rotational speed through said high speed motor, means including a time delay mechanism for effecting energization of said high speed motor subsequent to energization of said low speed motor, whereby said high speed motor is effective to drive and accelerate said power plant to a second and higher speed, means responsive to compressor pressure for effecting deenergization of said low speed motor when said compressor attains a speed intermediate said low speed and said higher speed, means for effecting energization of said fuel control mechanism and said igniting means at said intermediate speed, speed responsive means for effecting deenergization of said disengageable clutch and said high speed motor at said higher speed, and means for deenergizing said fuel control mechanism to stop the power plant, said compressor pressure responsive mechanism being operable to effect reenergization of said low speed motor and said speed responsive means being operable to effect reengagement of said disengageable clutch when said power plant speed decelerates to said intermediate speed.

4. In a gas turbine power plant including a compressor, a gas turbine for driving said compressor, fuel combustion structure disposed between said compressor and said gas turbine for providing hot motive gases to said turbine, means for controlling fuel flow to said combustion structure, and means for igniting the fuel delivered to said combustion structure; a starting and stopping system comprising a first motor, a second motor disposed in tandem with said first motor, said second motor being interposed between said first motor and said turbine, an overriding clutch interposed between said first and second motors, a disengageable clutch interposed between said second motor and said turbine, said first motor being operative to drive said turbine at a low rotary speed, said second motor being operative to drive said turbine at a high rotary speed, means for effecting engagement of said disengageable clutch, means for effecting energization of said first motor to initiate rotation of said turbine, means for effecting energization of said second motor subsequent to engagement of said disengageable clutch, whereby said second motor is rendered effective to accelerate and drive said turbine at said high speed, means effective to deenergize said second motor subsequent to attainment of said high speed by said turbine, means for energizing said fuel control means and said igniting means at a speed intermediate said low and high speeds, means responsive to a condition of said power plant indicative of termination of fuel flow for effecting energization of said first motor, whereby said power plant is driven at said low speed by said first motor, and means responsive to turbine temperature for effecting deenergization of said first motor when said temperature drops to a substantially high atmospheric temperature value.

5. In a gas turbine power plant including a compressor, a gas turbine for driving said compressor an electric generator, reduction gearing connecting said generator to said gas turbine, fuel combustion structure disposed between said compressor and said gas turbine for providing hot motive gases to said turbine, means for controlling fuel flow to said combustion structure, and means for igniting the fuel delivered to said combustion structure; a starting and stopping system comprising a low speed output motor, a high speed output motor disposed in tandem with said low speed motor, said high speed motor being interposed between said low speed motor and said generator, an overriding clutch interposed between said motors, a disengageable clutch interposed between said high speed motor and said generator, said low speed motor being operative to drive said power plant at a low rotary speed, said high speed motor being operative to drive and accelerate said power plant to a self-sustaining speed, means for effecting engagement of said disengageable clutch, means for effecting energization of said low speed motor to initiate rotation of said turbine, means including a time delay mechanism for effecting energization of said high speed motor subsequent to engagement of said disengageable clutch, whereby said high speed motor is rendered effective to accelerate and drive said turbine to said self-sustaining speed, means for energizing said fuel control and said igniting means at a speed intermediate said low and said self-sustaining speeds, means effective to deenergize said low speed motor at substantially said intermediate speed, means effective to deenergize said high speed motor subsequent to attainment of said self-sustaining speed by said power plant, means responsive to a condition of said power plant indicative of termination of fuel flow for effecting energization of said low speed motor and engagement of said disengageable clutch, whereby said high speed motor is connected to said power plant and said power plant is driven at said low speed by said low speed motor, and means responsive to turbine temperature for effecting deenergization of said disengageable coupling and said low speed motor when said temperature drops to a value substantially lower than the operating temperature of said turbine.

6. In a power plant including an electric generator, a gas turbine engine, and reduction gearing operatively connecting said gas turbine engine to said generator; said gas turbine engine having a compressor, a gas turbine for driving said compressor, fuel combustion structure disposed between said compressor and said gas turbine for providing hot motive gases to said turbine, means including a fuel control mechanism for controlling fuel flow to said combustion structure, and means for igniting the fuel delivered to said combustion structure: a starting and stopping system comprising a low speed output motor, a high speed motor disposed in tandem with said low speed motor and interposed between said low speed motor and said generator, an overriding clutch interposed between said motors, a disengageable clutch interposed between said high speed motor and said generator, means for controlling said disengageable clutch, means responsive to engagement of said disengageable clutch for effecting energization of said low speed motor, whereby said low speed motor is effective to initially drive said power plant at a low rotational speed through said high speed motor, means including a time delay mechanism for effecting energization of said high speed motor subsequent to energization of said low speed motor, whereby said high speed motor is effective to drive and accelerate said power plant to a second and higher speed, means responsive to compressor pressure for effecting deenergization of said low speed motor when said compressor attains a speed intermediate said low speed and said higher speed, means for effecting energization of said fuel control mechanism and said igniting means at said intermediate speed, speed responsive means for effecting deenergization of said disengageable clutch and said high speed motor at said higher speed, means for deenergizing said fuel control mechanism to stop the power plant, said compressor pressure responsive mechanism being operable to effect reenergization of said low speed motor and said speed responsive means being operable to effect reengagement of said disengageable clutch when said power plant speed decelerates to said intermediate speed, and means responsive to temperature of said turbine for deenergizing said low speed motor when the turbine temperature drops to a substantially atmospheric value.

References Cited in the file of this patent
UNITED STATES PATENTS

| | | |
|---|---|---|
| 1,795,030 | Martineau | Mar. 3, 1931 |
| 2,262,195 | Noack | Nov. 11, 1941 |
| 2,476,218 | Prime et al. | July 12, 1949 |
| 2,617,253 | Fusner et al. | Nov. 11, 1952 |